Jan. 19, 1943. E. F. RIESING 2,308,965
BUSHING
Filed Dec. 27, 1940 2 Sheets-Sheet 1
FIG. I.
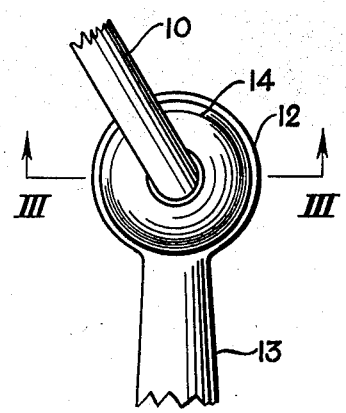
FIG. II.
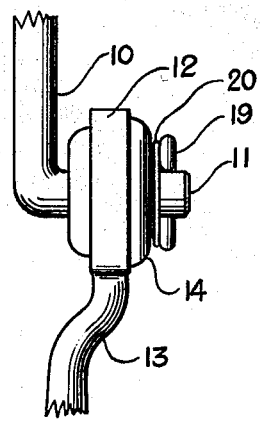
FIG. III.
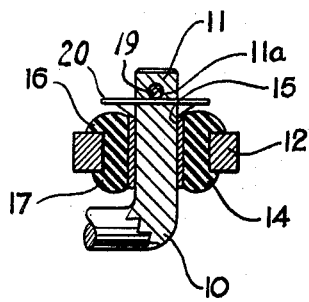
FIG. IV.
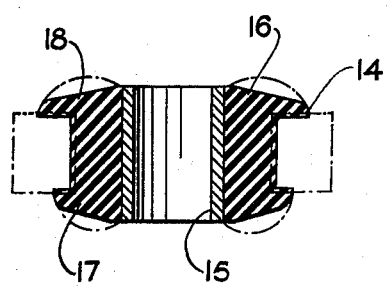
INVENTOR
Ellwood F. Riesing
ATTORNEYS Jan. 19, 1943. E. F. RIESING 2,308,965
BUSHING
Filed Dec. 27, 1940 2 Sheets-Sheet 2
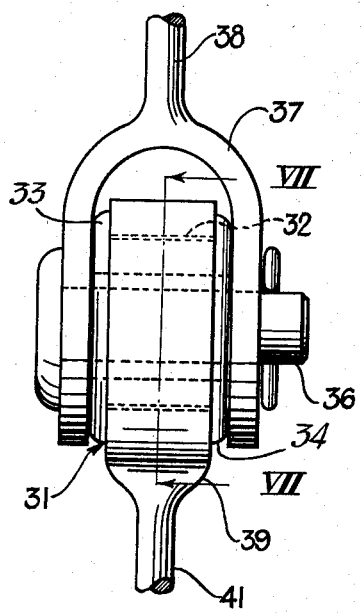
FIG. V
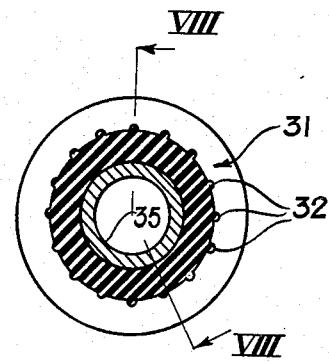
FIG. VI
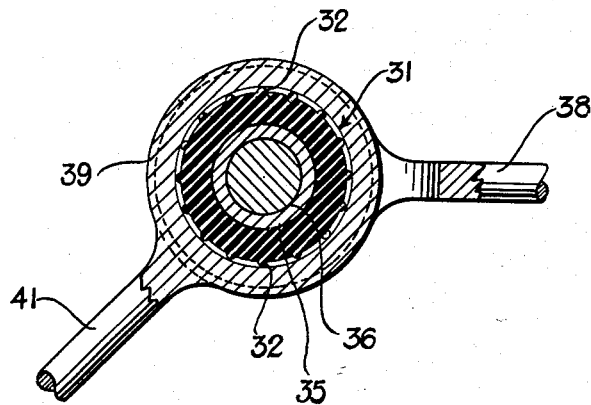
FIG. VII
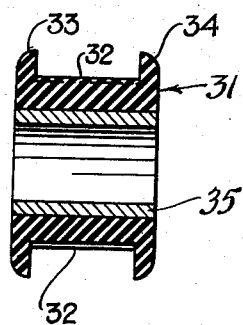
FIG. VIII
INVENTOR
Ellwood F. Riesing
BY
ATTORNEYS Patented Jan. 19, 1943

2,308,965

UNITED STATES PATENT OFFICE 2,308,965

BUSHING

Ellwood F. Riesing, Akron, Ohio, assignor to The Firestone Tire & Rubber Company, Akron, Ohio, a corporation of Ohio Application December 27, 1940, Serial No. 371,904

3 Claims. (Cl. 308—26)

This invention relates to bushings and bushing assemblies, especially to bushings functioning as insulators connecting two movable parts without transmitting vibrations from one part to the other.

One example of accessories of the above type is that between a gear shift shaft and an arm connecting to the transmission. In such cases, a bushing has been used which comprises inner and outer metal sleeves with a rubber body extending between and being vulcanized to both the inner and outer sleeves. These bushings are objectionable in that they must be made to an exact size in order to fit in the apparatus properly and such bushings are rather expensive, especially with relation to the bushings of the present invention.

A general object of the present invention is to provide an improved, inexpensive, easily manufactured rubber bushing adapted to prevent transmission of vibration between the metal parts which it connects, while also enabling one part to move with relation to the second part.

Another object of the invention is to provide a rubber bushing especially adapted to connect a shaft to an associated member.

The foregoing and other objects will appear as the description proceeds.

The invention is described with particular reference to the accompanying drawings in which:

Figure 1 is a plan of a bushing assembly embodying the invention;

Figure 2 is a side elevation of the assembly of Figure 1;

Figure 3 is an inverted vertical section on line 3—3 of Figure 1;

Figure 4 is an enlarged section through an uncompressed rubber bushing of the invention with the compressed position of the bushing being indicated in dotted lines;

Figure 5 is an enlarged elevation of a modified bushing assembly of the invention;

Figure 6 is an enlarged transverse section of the modified bushing shown in Figure 5;

Figures 7 and 8 are sections taken on lines 7—7 and 8—8 of Figures 5 and 6, respectively.

Referring specifically to the accompanying drawings, a metal rod 10 having an end portion 11 extending at right angles therefrom is shown. The end portion 11 is to be connected to an eyelet, or eye, 12 formed at the end of a second metal arm 13 which may extend in substantially the same direction as the arm 10.

The end portion 11 of the arm 10 is connected to the eyelet 12 through a bushing 14 which comprises a metal sleeve 15 to which is vulcanized an annular rubber body 16. The sides of the rubber body 16 taper axially inwardly as they extend radially outwardly from the sleeve 15. Annular flanges 17 and 18 are formed at the edges of the rubber body 16 with the flange 18 being substantially thicker and extending farther from the rubber body 16 than the flange 17. The flanges 17 and 18 are adapted to engage with the sides of the eye 12 and retain the bushing 14 in position. The diameter of the rubber body 16 is made slightly larger than the inner diameter of the eye 12, while the distance between the inner surfaces of the flanges 17 and 18 is less than the thickness of the eye. Hence the rubber bushing must be compressed radially and expanded axially to be positioned between the end 11 of arm 10 and the eye 12. Such compression and tension set up in the rubber body 16 materially aids the rubber bushing in retaining itself in engagement with the eye. Initial engagement of the bushing 14 and eye may be facilitated by forming the flange 17 smaller than the flange 18 which expedites forcing the bushing into engagement with the eye. The rubber bushing may be soaped to aid in slipping it into position.

The metal sleeve 15 is adapted to be slid over the end of the arm 11 and be retained in engagement therewith by a cotter pin 19 that extends through a hole 11a in the end of the arm. A spring washer 20 may be positioned between the sleeve and the cotter pin, as shown, to aid in positioning the bushing.

In Figure 5, an enlarged elevation of an assembly of a modified embodiment of the invention is shown. A rubber bushing 31, which has axially extending, circumferential spaced, ribs 32 formed on the cylindrical outer surface thereof, is shown. This bushing 31 is generally similar to the bushing 16, but has flanges 33 and 34 which are of substantially the same height and size. The bushing 31 is vulcanized to a metal sleeve 35 which is carried on a headed pin 36. The pin 36, in turn, engages with a clevis 37 formed on the end of a light rod 38 and the bushing 31 engages with an eye 39 formed on a second connecting rod or element 41, whereby the rods 38 and 41 are connected to a resilient member to prevent transmission of vibration therebetween and to allow a limited hinge action between the two rods.

It should be noted that the bushings of the invention are adapted to be used to connect rods or other elements having very light loads applied thereto. That is, the bushing constructions are to be used in transmitting forces in the nature of one-half to one and one-half pounds.

The assembly of the bushing 31 is shown in Figure 7 and it is seen that in assembling the bushing, its outer periphery is compressed slightly when it is inserted in the eye 39, as in assembling the bushing 14 in the eye 12. The compression of the periphery of the bushing pushes in the ribs or corrugations 32 on the periphery thereof and forms voids immediately adjacent the ribs between the periphery of the bushing and the inner surface of the eye. This aids in obtaining an easily distorted resilient connection between the rods 38 and 41.

From the foregoing it will be seen that a simple, easily constructed, inexpensive rubber bushing is provided in the invention. This bushing does not have to be made to an exact size whereby it is easy to manufacture. The use of but one metal sleeve in the bushing is a feature of the invention.

While the two embodiments of the invention have been completely illustrated and described herein it will be appreciated that modifications thereof may be made without departing from the scope of the invention, as defined in the appended claims.

What is claimed is:

1. In combination a rubber bushing of the class described having a peripheral housing contact surface and a sleeve on which it is permanently attached by vulcanization, said sleeve being carried on a shaft, the said shaft being supported by a bifurcated load rod, said bushing being housed in an annular eye formed at the end and integral with a second load rod, the said bushing having axially extending, circumferentially spaced ribs projecting from its peripheral housing contact surface, the outside diameter of said bushing between said ribs being less than the inside diameter of said eye thereby providing a substantial spacing between said bushing at the base of said ribs and said eye, the projection of said ribs being slightly greater than the said space, the said ribs being slightly depressed by contact with the inside surface of said eye whereby said load rods are joined and the vibrations of one such rod is absorbed by the cushioning effect of said ribs and prevented from being communicated to the other load rod.

2. A bushing of the class described in combination with two load rods, said bushing forming a connection between said rods, bushing being mounted on a shaft of one of said rods and in an eye of another of said rods, said bushing having circumferentially spaced ribs projected from its peripheral surface a predetermined distance, said distance being such that each of said ribs contact the inside surface of said eye and are only slightly depressed whereby means for a limited movement between said rods are provided 3. A bushing of the class described in combination with two load rods, said bushing forming a connection between said rods, bushing being mounted on a shaft of one of said rods and in an eye of another of said rods, said bushing having circumferentially spaced ribs projected from its peripheral surface a predetermined distance, said distance being such that each of said ribs contact the inside surface of said eye and are only slightly depressed whereby means for absorbing vibrations are provided thereby preventing the vibrations of one of said rods from being communicated to the other rod.

ELLWOOD F. RIESING.